(12) United States Patent
Mueller et al.

(10) Patent No.: US 7,221,384 B2
(45) Date of Patent: May 22, 2007

(54) METHOD FOR OPERATING A MULTIMEDIA COMMUNICATIONS NETWORK

(75) Inventors: Harald Mueller, Gilching (DE); Juergen Totzke, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 1274 days.

(21) Appl. No.: 10/055,019

(22) Filed: Jan. 25, 2002

(65) Prior Publication Data

US 2002/0112246 A1    Aug. 15, 2002

(30) Foreign Application Priority Data

Jan. 26, 2001    (DE) ................ 101 03 527

(51) Int. Cl.
*H04N 7/14*    (2006.01)
(52) U.S. Cl. ................ 348/14.01; 370/395.21
(58) Field of Classification Search ............ 348/14.01; 709/224; 370/395.21
See application file for complete search history.

(56) References Cited

U.S. PATENT DOCUMENTS 7,023,839 B1 * 4/2006 Shaffer et al. ............ 370/356

OTHER PUBLICATIONS

ITU-T Recommendation H.323, Series H: Audiovisual and Multimedia Systems, Infrastructure of audiovisual services—Systems and terminal equipment for audiovisual servoces, "Packet-Based Multimedia Communications Systems", c. Feb. 1998.
Roy "Application Layer QOS Signaling Architecture and Protocol: H.323 Application Specific and Generic Value Added Services" ITU-Telecommunication Standardization Sector, Nov. 2000, pp. 1-16.
Buckley "End to End QOS Control and Signalling in H.323 Systems" ITU-Telecommunication Standardization Sector, Feb. 2000, pp. 1-56.
Schulzrinne et al. "RTP: A Transport Protocol for Real-Time Applications" Network Working Group Request for Comments: Jan. 1996, pp. 1-38.
Clark et al. "Providing Scalable Web Services Using Multicast Communication" Computer Network and ISDN Systems 29 (1997), pp. 841-858.

* cited by examiner

*Primary Examiner*—Stella Woo
(74) *Attorney, Agent, or Firm*—Morrison & Foerster LLP

(57) ABSTRACT

In order to operate a multimedia communications network having at least two endpoints and at least one registration unit, a more simple identification of the media connection for the purpose of bandwidth reservation and service quality assurance in the transport network is achieved in that, after the arrival or authorization of a call, a call status request message is transmitted by the registration unit to the endpoints respectively involved in the call, which call status request message includes a request to the endpoints to report, in a call status acknowledge message, the properties of a media and/or data connection which is set up between the endpoints in connection with the call.

20 Claims, 4 Drawing Sheets

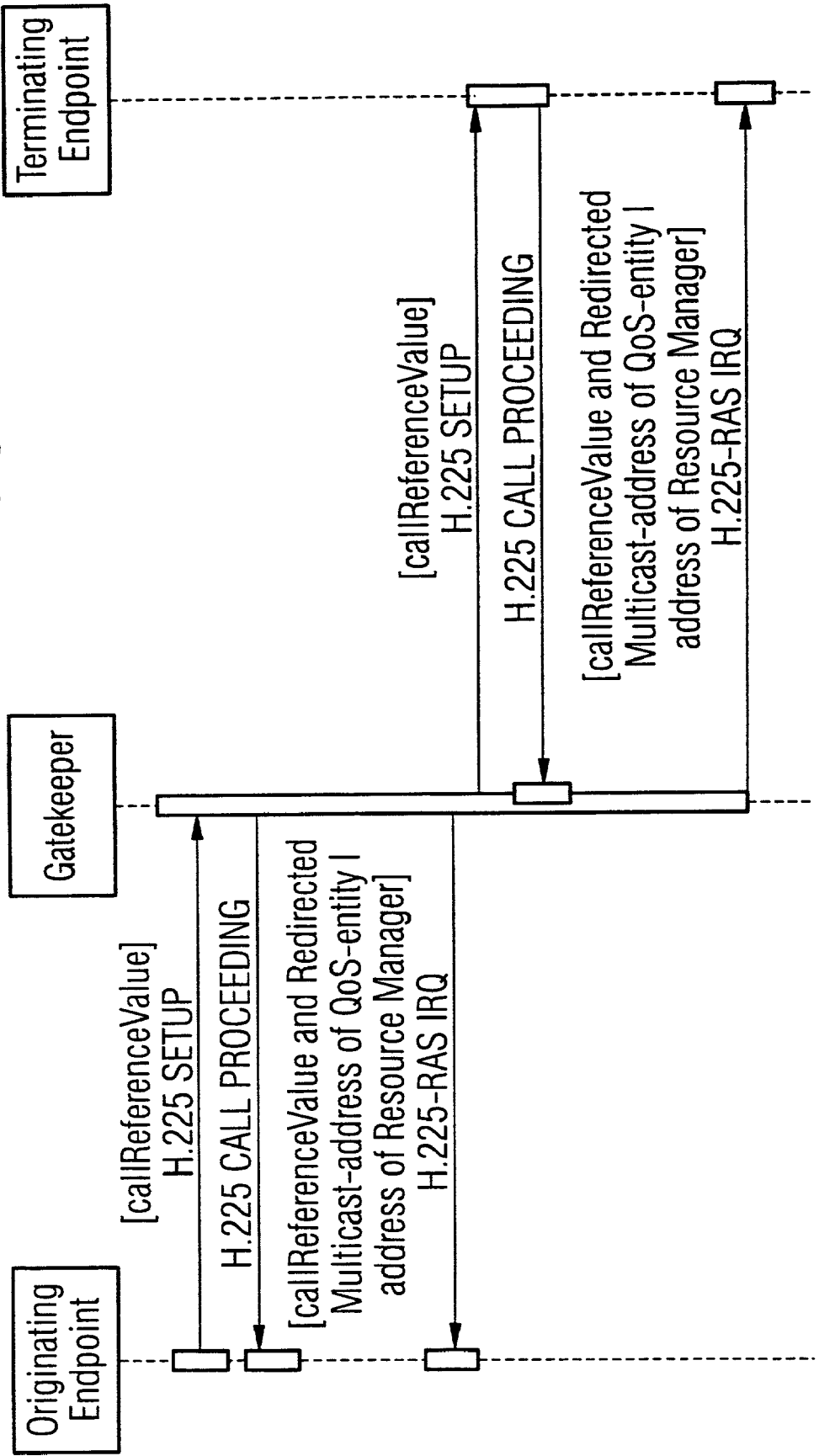

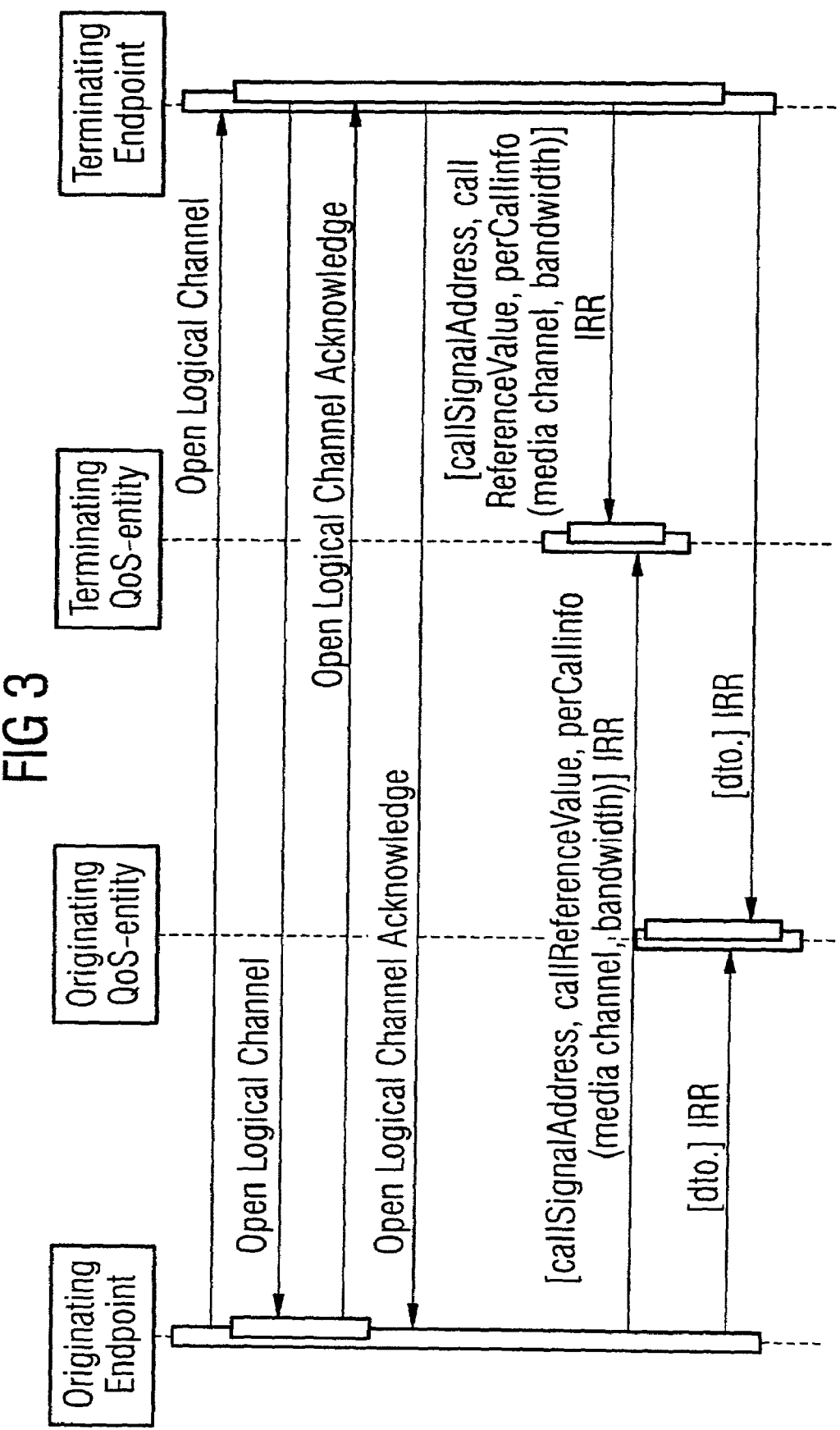

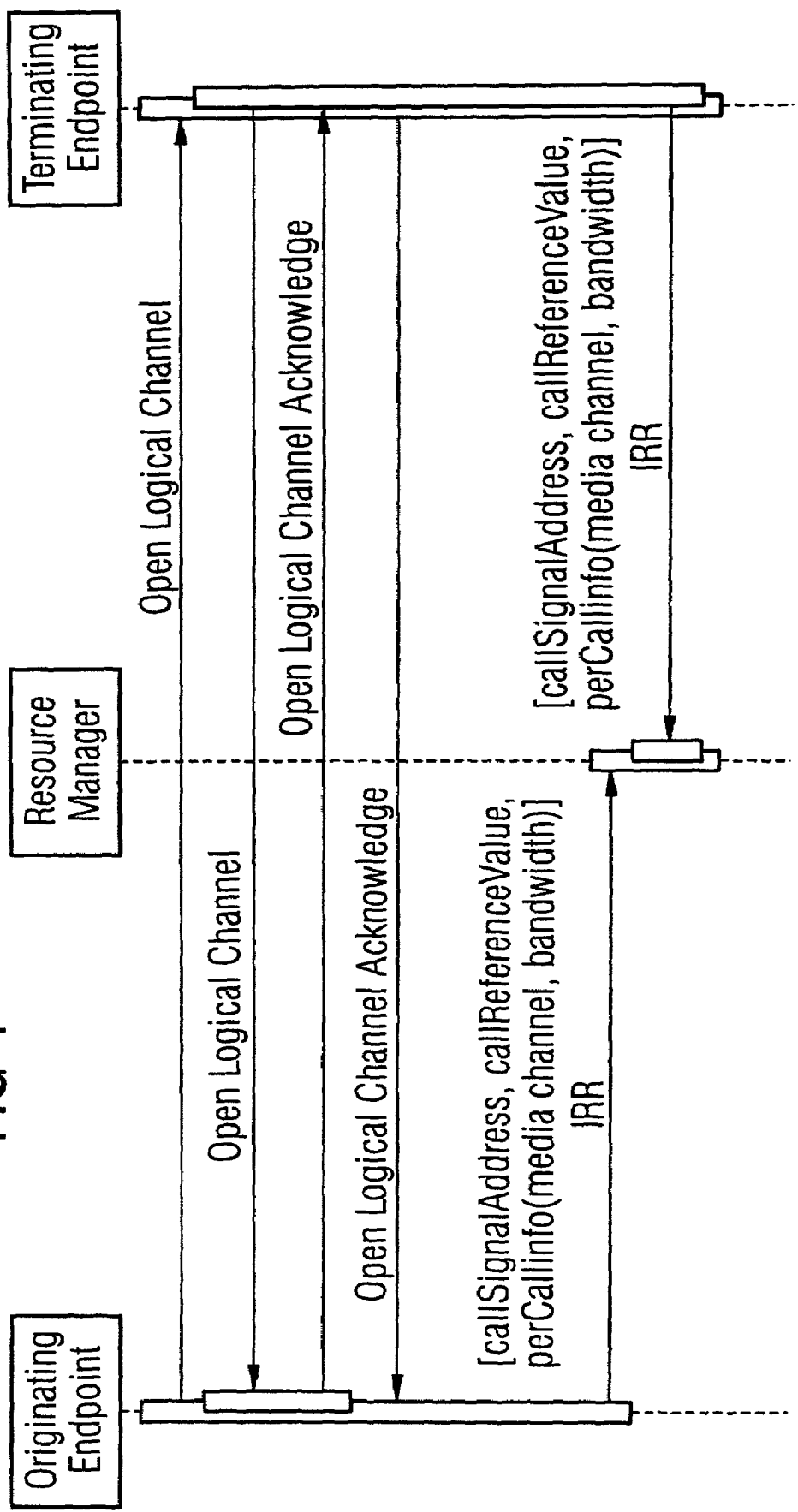

METHOD FOR OPERATING A MULTIMEDIA COMMUNICATIONS NETWORK

CLAIM FOR PRIORITY

This application claims priority to Application No. DE 10103527.6 which was published in the German language on Jan. 26, 2001.

TECHNICAL FIELD OF THE INVENTION

The invention relates to a method for operating a multimedia communications network, and in particular, to a network having at least two endpoints and at least one registration unit.

BACKGROUND OF THE INVENTION

Registration units are network elements or network functions in which the users of the endpoints prove their identity and register themselves and which authorize the imminent call. In an H.323-based multimedia network structure, the gatekeeper is such a registration unit. In SIP-based multimedia networks, it is the SIP server with its server functions, for example registrar or redirect server.

Multimedia communications networks are networks, for example for video conferences, in which the information (video and/or audio and data service components) are transmitted, for example, via the Internet by means of standardized signaling methods, for example in accordance with the ITU-T standard H.323 or the Session Initiation Protocol (SIP) defined by the IETF. The use of the H.323 standard makes it possible, within the scope of a call, to set up media connections (audio and video) and data connections simultaneously. As a result, the subscribers in the video conference can simultaneously process a common document, speak to one another, and see one another. However, it is also possible to set up and release just one or two of the aforesaid types of connection (video, audio, data) in a call.

The unidirectional media connections and the bidirectional data connections are each identified by their transport address. In the IP-based Internet, this is the IP address and what is referred to as the UDP/TCP port number.

Depending on the type of connection (media or data), the requirements made of the bandwidth of the connection in the network which has to be reserved for the service component vary. In addition, depending on the type of service, different requirements are made of the quality of service (Quality-of-Service: QoS), expressed in jitters, end-to-end delays and packet loss (also due to bit errors) in the network.

In order to monitor and ensure the quality of service of a connection, it is known to add the QoS devices to the network. QoS devices are network elements or network functions which monitor and ensure the quality of service. However, for the QoS devices to be able to monitor the connections and manage resources, it is necessary to determine the respective transport addresses of the connections.

The determination of the transport addresses is a multi-stage iterative process in the H.323 signaling protocol, in which process the signaling channels have to be successfully tested within the scope of the call and connection setup of the H.323 protocol (H.225-RAS, H.225/Q.931, H.245). The determination of the transport address is additionally made difficult by the fact that the H.323 protocol provides a plurality of options for the H.245 signaling (for example Normal Call Setup, Early H.245, Fast Connect, H.245-Tunneling). The determination of the transport address by means of the known iterative methods is time-critical because as a result the network elements are loaded, it is implementation-intensive because possible ways of carrying out the iterative method have to be provided, and is susceptible to errors.

SUMMARY OF THE INVENTION

In one embodiment of the invention there is a system for operating a multimedia communications network. The system includes, for example, at least two endpoints and at least one registration unit wherein, after the arrival or authorization of a call, a call status request message is transmitted by one of the registration units to at least one of the two endpoints involved in the call, the call status request message includes a request to the two endpoints to report properties of the media and/or data connection which is established between the two endpoints in connection with the call.

In another embodiment of the invention, there is a system for operating a multimedia communications network. The system includes, for example, at least two endpoints between which media and/or data connections are established by a call, wherein after the arrival of the call, a call status request message is transmitted by one of the two endpoints to at least one of the two endpoints involved in the call, which call status request message includes a request to the two endpoints to report properties of the media and/or data connection which is set up between the two endpoints in connection with the call.

In another aspect of the invention, the call status request message includes a divert instruction for the call status acknowledge message.

In another aspect of the invention, the divert instruction requests the call status acknowledge message to be transferred to a QoS device.

In yet another aspect of the invention, the divert instruction includes an IP multicast address for which the QoS devices have been registered.

In another aspect of the invention, at least one QoS device acknowledges the call status acknowledge message.

In another aspect of the invention, the divert instruction requests that the call status acknowledge message be transferred to a resource manager.

In still at least one resource manager acknowledges the call status acknowledge message.

In another aspect of the invention, the call status request message includes a request to dispatch the requested call status acknowledge message cyclically.

In another aspect of the invention, after reception of the call status request message, at least one of the two endpoints repeatedly transmits the call status acknowledge messages if a media and/or data connection has change properties.

In yet another aspect of the invention, the call status request message includes a divert instruction for the call status acknowledge message.

In another embodiment of the invention, there is a method for operating a multimedia communications network. The method includes, for example, transmitting a call status request message to at least one of two endpoints in the network after the arrival or authorization of a call, the network having at least the two endpoints and at least one registration unit, which call status request message includes a request to the two endpoints to report properties of a media and/or data connection which is established between the endpoints in connection with the call.

In another embodiment of the invention, there is a method for operating a multimedia communications network. The method includes, for example, transmitting a call station request message by one of at least two endpoints in the network after the arrival of a call, the network having the at least two endpoints between which media and/or data connections are established by means of a call, which call status request message includes a request to the two endpoints to report properties of a media and/or data connection which is established between the endpoints in connection with the call.

In another aspect of the invention, the call status request message includes a divert instruction for the call status acknowledge message.

In another aspect of the invention, the divert instruction requests the call status acknowledge message to be transferred to a QoS device.

In yet another aspect of the invention, the divert instruction includes an IP multicast address for which the QoS devices have been registered.

In another aspect of the invention, at least one QoS device acknowledges the call status acknowledge message.

In another aspect of the invention, the divert instruction requests that the call status acknowledge message be transferred to a resource manager.

In still another aspect of the invention, at least one resource manager acknowledges the call status acknowledge message.

In another aspect of the invention, the call status request message includes a request to dispatch the requested call status acknowledge message cyclically.

In another aspect of the invention, after reception of the call status request message, one of the two endpoints repeatedly transmits the call status acknowledge message if a media and/or data connection changes properties.

In yet another aspect of the invention, the call status request message includes a divert instruction for the call status acknowledge message.

BRIEF DESCRIPTION OF THE DRAWINGS

Further advantages and details of the invention emerge from the explanation of the exemplary embodiment illustrated in the drawings. In the drawings.

FIG. 2 shows an initiating H.323 signaling sequence of messages between the endpoints to be connected and the gatekeeper of a network according to FIG. 1.

FIG. 3 shows a signaling sequence which follows FIG. 2, between the endpoints and a QoS device.

FIG. 4 shows a signaling sequence which follows FIG. 2, between the endpoints and a resource manager.

DETAILED DESCRIPTION OF THE PREFERRED EMBODIMENTS

Figure 1:
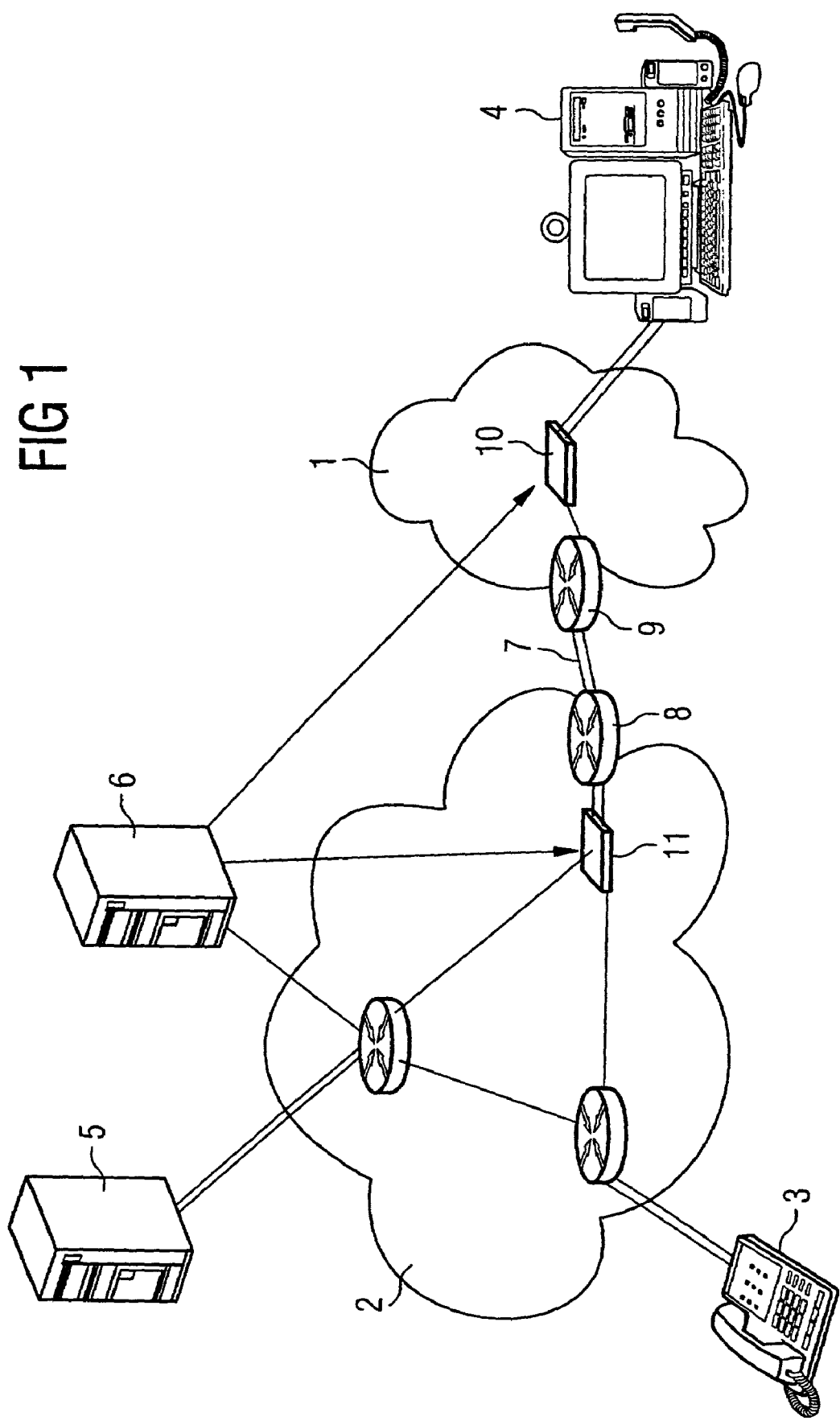
FIG. 1 shows an H.232-based multimedia network infrastructure of a small office structure, with networks which are operated with the method according to the invention.

The invention proposes a method for operating a multimedia communications network in which the identification of the connections takes place in simpler way.

In one embodiment, there is a multimedia communications network having at least two endpoints and at least one registration unit. After the arrival or authorization of a call, a call status request message is transmitted by the registration unit to the endpoints respectively involved in the call, which call status request message includes a request to the endpoints to report, in a call status acknowledge message, the properties of a media and/or data connection which is set up between the endpoints in connection with the call.

In the H.323 standard, the call status request message exists in the form of the H.225-RAS-IRQ message and the call status acknowledge message exists in the form of the H.225-RAS-IRR message and cannot be applied in a way which is compatible with standards.

The connection between the endpoints can be directly set up without intervention of the registration unit by separating the standardized signaling methods, call setup and release and connection setup and release.

The transport address is assigned to the media and/or data connection along this logic path. As a result of the of call status request and acknowledge messages, information is transmitted relating to the properties of the connection, which is known to the endpoints at the time of the setup of the connections at the latest, directly to the receiver without preceding costly iterative determination.

In another embodiment, the call status request messages instruct the endpoints to report the properties of the media connections which are set up between the endpoints, in particular the status, the transport address and the bandwidth to be found for the connection.

In the case of the H.323-based network, the H.225-RAS-IRQ messages are dispatched by the gatekeeper after the arrival of the call, that is to say as soon as a reference (callReferenceValue) has been assigned to the call.

In another embodiment of the method according to the invention, the registration unit may have an interface with a QoS device or a resource manager and for it to pass on its information to the QoS device or the resource manager after the reception of the call status acknowledge message.

Resource managers are units with network topology knowledge which monitor the current network usage and are involved in the call acceptance supervision of the connection with respect to the connection path.

In one aspect of the method, the call status request message includes a divert instruction for the call status acknowledge message. As a result, it is possible to transmit the information relating to the connection directly to a specific receiver without having the information passed on by the actual registration unit which is intended for reception. Thus, the divert instruction can request the call status acknowledge message to be transferred to the QoS device or else to a resource manager of the multimedia communications network. As a result, the information relating to the connection can more quickly be transferred to the desired receiver. In addition, the signaling traffic in the network is reduced by this measure.

In another embodiment of the invention, there is a multimedia communications network having at least two endpoints between which media and/or data connections are set up by means of a call. After the arrival of a call, a call status request message is transmitted by one of the endpoints to the endpoints respectively involved in the call, which call status request message includes a request to the endpoints to report, in a call status acknowledge message, the properties of a media and/or data connection which is set up between the endpoints in connection with the call.

In such a network—referred to as "gatekeeperless", in the H.323 standard, one endpoint assumes the role of the registration unit. This endpoint requests, by means of the call status request message, the further endpoints involved in the call to transmit call status acknowledge messages to a QoS device, for example. The endpoint which emits the call status request message can itself, if appropriate also emit an unrequested call status acknowledge request to the QoS unit.

When a plurality of QoS devices are used, it is preferable to register the QoS devices with an IP multicast address. The IP multicast address is then used as a divert destination address in the call status acknowledge messages. In this way, it is ensured that the information relating to the connections is passed on to all the affected QoS units.

In order to continuously monitor the media connection between the endpoints, it is preferable for the call status request message to include a request to dispatch the requested call status acknowledge message cyclically. The call status request message can be handled via the endpoints such that a call status acknowledge message is transmitted on request and unrequested call status acknowledge messages are subsequently transmitted whenever the properties of a connection have been changed. For example, if a media connection has been set up or released or has been changed in its bandwidth request. In this way, information relating to the media connections can be obtained, and which was not yet known at the time when the call status request message was dispatched, can be obtained virtually simultaneously.

The network structure as illustrated in FIG. 1 has two multimedia communications networks 1, 2, which are each operated according to the H.323 standard. The networks 1, 2 have endpoints 3, 4 and a registration unit 5 which is embodied as a gatekeeper, and a common resource manager 6. The networks 1, 2 are connected via a wide area network (WAN) link 7. For this purpose, each network 1, 2 has an access router 8 or 9, which is connected to the respective other access router via the WAN link 7. Each network 1, 2 also includes a QoS device 10 or 11 upstream or downstream of the access routers.

In this network structure, the H.323 call signaling takes place via the gatekeeper 5, while the H.323 media connection is set up directly between the endpoints 3, 4.

FIGS. 2 to 4 illustrate H.323 signaling sequences which occur when media connections are set up between the endpoints 3, 4 in accordance with the method according to the invention. Messages, in particular packets which include messages to the access routers 8, 9, and other messages of an H.323 network which are known to the person skilled in the art from regular practice are not illustrated for reasons of clarity.

In order to set up a call, an H.225-SETUP message is transmitted by the output endpoint (for example, endpoint 3) to the registration unit 5. If the registration unit 5 recognizes the call, it transmits, on the one hand, the customary H.225-CALL-PROCEEDING message to the output endpoint 3, and the customary H.225-SETUP message to the destination endpoint 4. In addition, the registration unit 5 transmits an H.225-RAS-IRQ message both to the output endpoint 3 and to the destination endpoint 4. This H.225-RAS message includes a divert instruction and an instruction to repeat the requested H.225-RAS-IRR message whenever the media connections assigned to the call are set up or released, or if its bandwidth request has changed, for example, as a result of a change in the media coding of the connection.

The divert instruction included in the H.225-RAS-IRQ message determines in the alternative illustrated in FIG. 3 a transmission of the respective H.225-RAS-IRR message of the endpoints 3, 4 to the QoS devices 11 and 10, respectively. The QoS devices are thus informed directly of the setup, the release and/or a change in the bandwidth requests of the media connection.

In an alternative embodiment illustrated in FIG. 4, the divert instruction of the H.225-RAS-IRQ message determines a transmission of the H.225-RAS-IRR message by the endpoints 3, 4 to the resource manager 6. The resource manager 6 passes on the information to the QoS devices 10, 11. If desired, the H.225-RAS-IRR message can be acknowledged by the resource manager 6 by means of H.225-RAS-IACK or -INACK messages which are not illustrated. In the case of a negative acknowledgment, the bandwidth and quality of service for the connection cannot be guaranteed.

In a further embodiment (not illustrated in more detail), the call status request message does not include any divert address. In this case, the call status acknowledge message is transmitted back by the endpoints to the registration unit 5. In the further embodiment, the registration unit 5 has an interface to the QoS devices or the resource manager and it passes on the call status acknowledge messages either directly to the QoS devices or to the resource manager, or passes on the information from the call status acknowledge messages in whatever protocol is defined on these interfaces.

The signaling sequences of a multimedia network structure, which are described above in detail, make it possible to simplify the identification of the media connections for the purpose of ensuring the quality of service and the resource management in the transport network.

What is claimed is:

1. A system for operating a multimedia communications network, comprising:
at least two endpoints and at least one registration unit wherein, after the arrival or authorization of a call, a call status request message is transmitted by one of the registration units to at least one of the two endpoints involved in the call, the call status request message includes a request to the two endpoints to report properties of the media and/or data connection which is established between the two endpoints in connection with the call, wherein the call status request message includes a divert instruction for the call status acknowledge message.

2. The system as claimed in claim 1, wherein the divert instruction requests the call status acknowledge message to be transferred to a QoS device.

3. The system as claimed in claim 2, wherein the divert instruction includes an IP multicast address for which the QoS devices have been registered.

4. The system as claimed in claim 2, wherein at least one QoS device acknowledges the call status acknowledge message.

5. The system as claimed in claim 1, wherein the divert instruction requests that the call status acknowledge message be transferred to a resource manager.

6. The system as claimed in claim 5, at least one resource manager acknowledges the call status acknowledge message.

7. The system as claimed in claim 1, wherein the call status request message includes a request to dispatch the requested call status acknowledge message cyclically.

8. The system as claimed claim 1, wherein after reception of the call status request message, at least one of the two endpoints repeatedly transmits the call status acknowledge messages if a media and/or data connection has change properties.

9. A system for operating a multimedia communications network, comprising:
at least two endpoints between which media and/or data connections are established by a call, wherein after the arrival of the call, a call status request message is transmitted by one of the two endpoints to at least one of the two endpoints involved in the call, which call status request message includes a request to the two endpoints to report properties of the media and/or data connection which is set up between the two endpoints in connection with the call, wherein the call status request message includes a divert instruction for the call status acknowledge message.

10. The system as claimed in claim 9, wherein the call status request message includes a divert instruction for the call status acknowledge message.

11. A method for operating a multimedia communications network, comprising:
transmitting a call status request message to at least one of two endpoints in the network after the arrival or authorization of a call, the network having at least the two endpoints and at least one registration unit, which call status request message includes a request to the two endpoints to report properties of a media and/or data connection which is established between the endpoints in connection with the call, wherein the call status request message includes a divert instruction for the call status acknowledge message.

12. The method as claimed in claim 11 wherein the divert instruction requests the call status acknowledge message to be transferred to a QoS device.

13. The method as claimed in claim 12, wherein the divert instruction includes an IP multicast address for which the QoS devices have been registered.

14. The method as claimed in claim 12, wherein at least one QoS device acknowledges the call status acknowledge message.

15. The method as claimed in claim 12, wherein the call status request message includes a divert instruction for the call status acknowledge message.

16. The method as claimed in claim 11, wherein the divert instruction requests that the call status acknowledge message be transferred to a resource manager.

17. The method as claimed in claim 16, wherein at least one resource manager acknowledges the call status acknowledge message.

18. The method as claimed in claim 11, wherein the call status request message includes a request to dispatch the requested call status acknowledge message cyclically.

19. The method as claimed in claim 11, wherein after reception of the call status request message, one of the two endpoints repeatedly transmits the call status acknowledge message if a media and/or data connection changes properties.

20. A method for operating a multimedia communications network, comprising:
transmitting a call station request message by one of at least two endpoints in the network after the arrival of a call, the network having the at least two endpoints between which media and/or data connections are established by means of a call, which call status request message includes a request to the two endpoints to report properties of a media and/or data connection which is established between the endpoints in connection with the call, wherein the call status request message includes a divert instruction for the call status acknowledge message.

* * * * *